Figure 1:
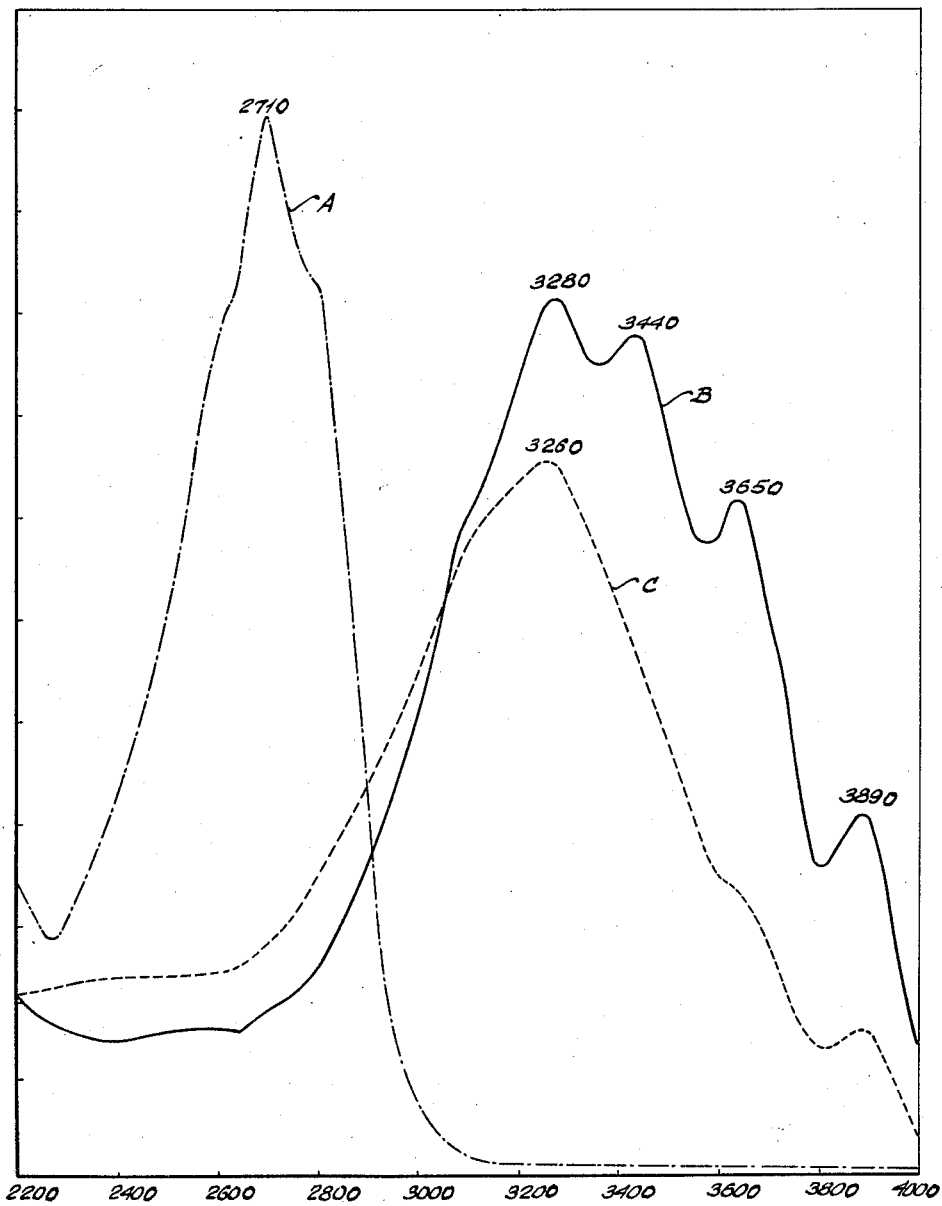

Jan. 7, 1958 W. OROSHNIK 2,819,316
SYNTHESIS OF VITAMIN A ISOMERS
Filed March 20, 1953 2 Sheets-Sheet 1

INVENTOR
WILLIAM OROSHNIK
BY Leroy F. Halley
ATTORNEY

---

2,819,316

SYNTHESIS OF VITAMIN A ISOMERS

William Oroshnik, Plainfield, N. J., assignor to Ortho Pharmaceutical Corporation, a corporation of New Jersey Application March 20, 1953, Serial No. 343,784

3 Claims. (Cl. 260—617)

This invention relates to compositions of matter and to methods for preparing the same and particularly relates to a process for the preparation of vitamin A ethers and esters and to compositions of matter which are intermediates in the process.

It has been shown by N. D. Embree and E. M. Shantz in U. S. Patent No. 2,410,575 that anhydrovitamin A having the formula

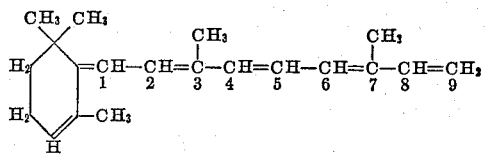

can be converted to vitamin A ethers by allowing it to react with alcohol in the presence of catalytic quantities of strong acids or to vitamin A esters by allowing it to react with organic acids. E. M. Shantz, N. D. Embree, and J. D. Cawley, Journal of the American Chemical Society, 1943, volume 65, page 901; and Meunier, Compt. rend., 1943, volume 216, page 907; 1948, volume 226, page 128, have described the preparation of anhydrovitamin A by the dehydration of vitamin A, by the dealcoholization of vitamin A ethers or by the deacylation of vitamin A esters.

It has been shown, William Oroshnik, G. Karmas, and A. D. Mebane, Journal of the American Chemical Society, volume 74, page 295 (1952), that, in the presence of catalytic quantities of acids, beta-ionol derivatives rearrange allylically and dehydrate to give retroionylidene compounds. The equation below illustrates such a rearrangement and dehydration of a beta-ionol derivative:

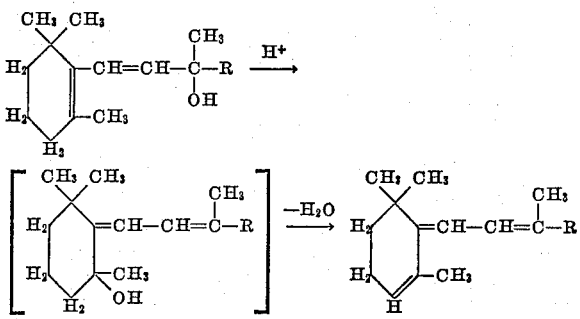

It is an object of this invention to prepare compounds to be used in the preparation of vitamin A ethers and esters.

It is another object of this invention to provide a process for the preparation of vitamin A ethers and esters.

Other objects of this invention will be apparent from the description following and the appended claims.

It has now been discovered that ethers and esters of vitamin A may be prepared from a compound having the following formula:

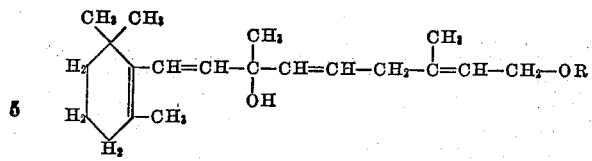

Compound I in which R is a lower alkyl radical. The preparation and properties of Compound I are given in the Oroshnik et al. publication identified above.

The treatment of Compound I with a metallic amide results in a loss of alcohol and the formation of Compound II having the formula

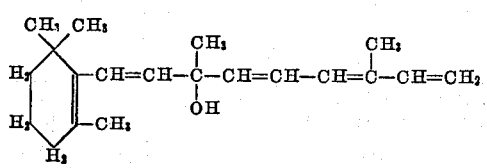

Compound II

Compound II is converted to anhydrovitamin A in the presence of a dehydrating agent.

Although sodamide in liquid ammonia is the preferred reagent for use in the conversion of Compound I to Compound II, other metallic amides, such as potassium and lithium amide and other solvents such as ether, and pyridine or other nitrogenous solvents may also be used.

It has also been discovered that Compound II may be synthesized from a compound having the formula

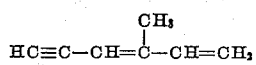

Compound III by the following reactions: Compound III is reacted with a Grignard reagent to replace the hydrogen on the terminal triple bonded carbon with MgX, in which X is halogen, the acetylenic Grignard is condensed with β-ionone to provide a condensation product having the formula

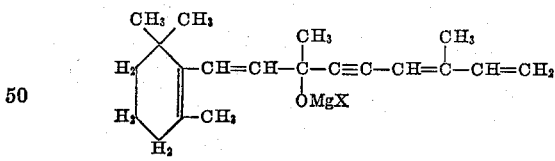

which is then hydrolyzed to replace the magnesium halide with hydrogen. The resulting compound has the formula

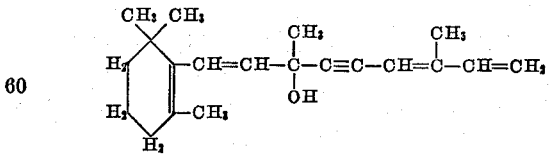

Compound IV and may be reduced with lithium aluminum hydride, to give Compound II having a trans configuration at the 4,5-double bonded linkage, or with hydrogen in the presence of a metallic catalyst, to give Compound II having a cis configuration at the 4,5-double bonded linkage.

Compound III may be prepared by either of two processes:

(A) Propargyl methyl vinyl carbinol having the formula

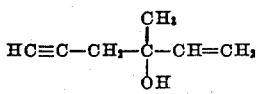

is treated with a halogenating agent such as concentrated hydrochloric, hydrobromic acid, phosphorous halides, or phosphorous oxyhalides to replace the hydroxyl group with halogen. The resulting propargyl methyl vinyl carbinol halide having the formula

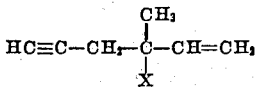

in which X is halogen, is treated with a base such as an alkali metal alcoholate or collidine to give Compound III.

(B) Ethinyl tiglol, having the formula

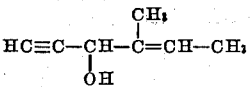

is treated with a halogenating agent such as concentrated hydrochloric acid, hydrobromic acid, phosphorous halides, or phosphorous oxyhalides to replace the hydroxyl group with halogen and to simultaneously bring about allylic rearrangement to provide a compound having the formula

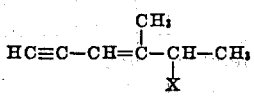

Compound V in which X is halogen. Compound V is converted to Compound III by treatment with a base such as an alkali metal alcoholate or collidine.

Figure 2:
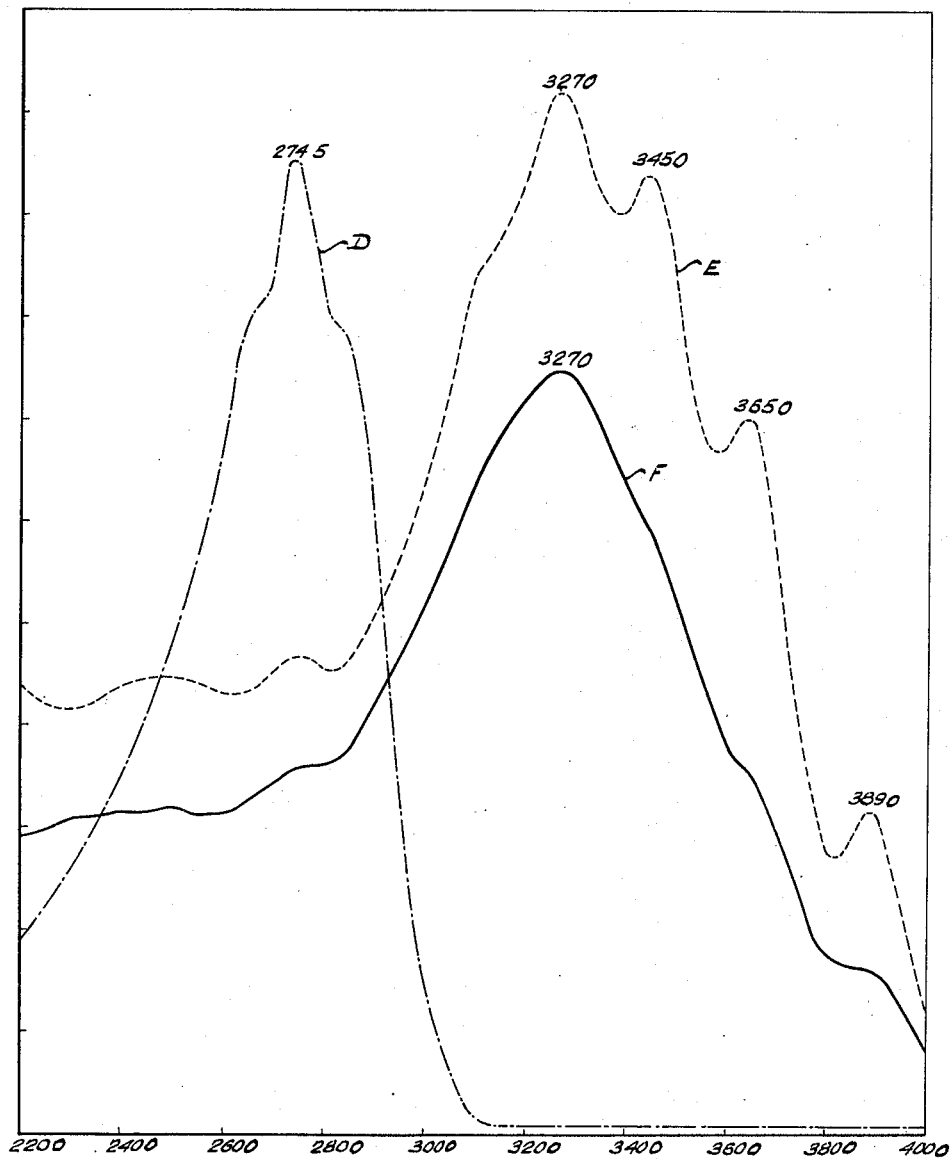

Figures 1 and 2 each show three ultraviolet absorption curves, in which wavelength in Angstrom units is plotted on the abscissa and the corresponding molecular coefficient of extinction is plotted on the ordinate.

The following examples are given merely to illustrate specific ways in which the invention may be practiced and it is to be understood that the invention is not to be limited or restricted thereby.

EXAMPLE I

*Preparation of Compound II*

A solution of sodamide in liquid ammonia was prepared by adding 9.2 grams of metallic sodium to one liter of liquid ammonia to which had been previously added 0.2–0.5 gram of hydrated ferric nitrate. After all the sodium had reacted the solution was cooled to −40° C. and a solution of 34.0 grams of Compound I in 275 milliliters of anhydrous ether was added during ten to twenty minutes. The reaction mixture turned a brilliant ultramarine blue and remained thus for the duration of the reaction period which was two hours at −30° C. The reaction was stopped by the addition of excess ammonium chloride and the ammonia allowed to evaporate. The remaining ether solution was removed and distilled. The product was collected at 95° C. at 0.001 millimeter of mercury pressure. It was arbitrarily cut into two fractions in order to concentrate the demethoxylated portion as much as possible. Both fractions consisted essentially of Compound II. The first fraction which weighed 20.1 grams had a refractive index at 22° C. of 1.5462 and showed absorption in the ultraviolet with a maximum at 2740 A. The first fraction was found to have a methoxyl value of 1.9%. The second fraction which weighed 3.7 grams had a refractive index at 22° C. of 1.5362 and showed absorption in the ultraviolet with a maximum at 2740 A. This fraction had a methoxyl value of 4.1%. Both fractions were purified chromatographically on an alumina column and the product obtained had a refractive index at 23.5° C. of 1.5509 and showed absorption in the ultraviolet with a maximum at 2750 A. and a molecular coefficient of extinction of 31,658. The calculated values for carbon and hydrogen were 83.86% and 10.56% respectively. Analysis showed 83.56% carbon and 10.55% hydrogen.

EXAMPLE II

*Preparation of Compound III from propargyl methyl vinyl carbinol*

A mixture of 40 grams of propargyl methyl vinyl carbinol, 160 milliliters of concentrated hydrochloric acid, 100 milliliters of ether and 0.1 gram hydroquinone was shaken at room temperature for three and one-half hours. The mixture was diluted with water, the ether layer separated, washed with brine, and added to a solution of 12.5 grams of sodium in 120 milliliters of methanol. The mixture was refluxed with stirring for three hours, during which time the ether was distilled off. The remaining methanol solution was poured into a large volume of water and extracted with pentane. After drying, the pentane was fractionated off and the residue was distilled at 90 millimeters of mercury pressure. The product, which weighed 17.9 grams, distilled at 53–54° C., had a refractive index at 17° C. of 1.5158, and showed absorption in the ultraviolet with a maximum at 2590 A. with a molecular coefficient of extinction at that wavelength of 21,500. The calculated values for carbon and hydrogen are 91.24% and 8.76% respectively. 91.29% carbon and 8.96% hydrogen were found on analysis.

EXAMPLE III

*Preparation of Compound IV*

A solution of 11.8 grams of Compound III in 250 milliliters of dry ether was treated at 10° C. with 2 to 5% excess ethyl magnesium bromide. Ethane was spontaneously evolved, as the solution came to room temperature. After stirring at room temperature for three hours, the solution was refluxed for an additional 15 hours, after which time gas was no longer evolved. The solution was then cooled to 10° C. and 25.7 grams of β-ionone were dropped in during ten minutes. After a two-hour period of refluxing, the mixture was again cooled and carefully hydrolyzed with ammonium acetate solution. The ether layer was removed, washed with water, dried over anhydrous potassium carbonate, and concentrated under vacuum. The vacuum concentrated material was distilled at 0.001 millimeter of mercury pressure and the distilled material had a refractive index at 21° C. of 1.5548, showed absorption in the ultraviolet with a maximum at 2670 A. and had a molecular coefficient of extinction at this wavelength of 23,800. The calculated values for carbon and hydrogen are 84.45% and 9.92% respectively. 84.35% carbon and 9.93% hydrogen were found on analysis.

EXAMPLE IV

*Reduction of Compound IV to Compound II in which the 4,5-double bonded linkage has a trans configuration*

A solution of 29.4 grams of Compound IV in 100 milliliters of dry ether was added to a suspension solution of 3.5 grams of commercial lithium aluminum hydride in 300 milliliters of dry ether at 0° C. The mixture was refluxed for three hours, after which time it was cooled and hydrolyzed with 70% methanol. The precipitated alumina was filtered off, and the ether layer separated, washed with water, dried with anhydrous potassium carbonate, and distilled at 0.001 millimeter of mercury pressure. The distilled product had a refractive index at 20° C. of 1.5526 and showed absorption in the ultraviolet with a maximum at 2710 A. and a molecular coefficient of extinction at that wavelength of 29,100. The calculated values for carbon and hydrogen are 83.86% and 10.56% respectively. 83.61% carbon and 10.46% hydrogen were found on analysis.

EXAMPLE V

*Catalytic reduction of Compound IV to Compound II in which the 4,5-double bonded linkage has a cis configuration*

To a solution of 27.0 grams of Compound IV in 150 cc. of methanol was added 2.5 grams of Raney nickel, 0.5 gram of zinc acetate and 10 milliliters of piperidine. The latter two components are catalyst poisons for making the hydrogenation more selective. The mixture was then shaken under hydrogen at atmospheric pressure until the theoretical amount of hydrogen was absorbed. The mixture was then filtered and worked up with water and ether. The ether was removed and the concentrated material was distilled at 0.01 millimeter of mercury pressure. 20.9 grams of distillate were obtained. The distillate had a refractive index at 16° C. of 1.5353 and showed absorption in the ultraviolet with a maximum at 2720 A. and a molecular coefficient of extinction at that wavelength of 15,600. Calculated values for carbon and hydrogen for Compound II are 83.86% and 10.56% respectively. 83.87% carbon and 10.81% hydrogen were found on analysis.

EXAMPLE VI

*Conversion of Compound II, in which the 4,5-double bonded linkage has a trans configuration, to vitamin A methyl ether*

A solution of 3.0 grams of Compound II, in which the 4,5-double bonded linkage had a trans configuration, in 900 milliliters of methanol was cooled to 0° C. and treated with a solution of three drops of boron trifluoride etherate in 125 milliliters of methanol. Within five minutes the spectrum of the solution was substantially that of anhydrovitamin A, while that of Compound II had virtually disappeared. The solution was then stored under nitrogen at 5° C. After 19 hours, the utlraviolet absorption spectrum of vitamin A methyl ether, in which the maximum is at 3260–3280 A., was very prominent. Spectral analysis indicated about 90% vitamin A methyl ether and 10% anhydrovitamin A were present in the reaction mixture. Both anhydrovitamin A and vitamin A methyl ether were isolated by chromatography on alumina. In Figure 1, curve A is the ultraviolet absorption spectrum of trans-Compound II, curve B the ultraviolet absorption spectrum taken one hour after trans Compound II had been allowed to react in methanol solution with boron trifluoride etherate and curve C the ultraviolet absorption spectrum taken after trans Compound II had been reacted in methanol with boron trifluoride etherate for 98 hours.

EXAMPLE VII

*Conversion of Compound II, in which the 4,5-double bonded linkage has a cis configuration, to vitamin A methyl ether*

The amounts and conditions of this example were the same as those of Example VI except that Compound II, in which the 4,5-double bonded linkage had a cis-configuration, was used. Twenty-four hours after the start of the reaction spectral analysis indicated about 90% vitamin A methyl ether and 10% anhydrovitamin A were present in the reaction mixture. Both anhydrovitamin A and vitamin A methyl ether were isolated by chromatography on alumina. In Figure 2, curve D is the ultraviolet absorption spectrum of cis Compound II, curve E the ultraviolet absorption spectrum taken eighty minutes after cis Compound II had been allowed to react in methanol solution with boron trifluoride etherate, and curve F the ultraviolet absorption spectrum taken after cis Compound II had been reacted in methanol with boron trifluoride etherate for 120 hours.

EXAMPLE VIII

*Conversion of Compound II, in which the 4,5-double bonded linkage has a trans-configuration, to vitamin A acetate*

A solution of three grams of Compound II, in which the 4,5-double bonded linkage had a trans configuration was dissolved in one liter of glacial acetic acid and allowed to stand at room temperature for three days. It was then diluted in a large volume of water and extracted with petroleum ether. The petroleum ether solution, after neutralization with sodium bicarbonate solution and drying, was concentrated under vacuum to a viscous syrup. Vitamin A acetate was obtained from the syrup by chromatography on an alumina column.

EXAMPLE IX

*Preparation of Compound III from ethynyl tiglol*

A mixture of 40 grams of ethynyl tiglol, 200 milliliters of concentrated hydrochloric acid, and 100 milliliters of ether and 0.1 gram hydroquinone were shaken at room temperature for two hours. The mixture was then diluted with water, the ether layer separated and added to a solution of 12.5 grams of sodium in 250 milliliters of isopropanol. The mixture was refluxed for three hours, cooled, poured into a large volume of water and extracted with pentane. The pentane solution was dried, and the pentane was removed by distillation. The residue was distilled at 90 milliliters of mercury pressure. The product, which weighed 13 grams, distilled at 53–54° C. and had a refractive index at 17° C. of 1.5158; and showed absorption in the ultraviolet with a maximum at 2590 A. and a molecular coefficient of extinction at that wavelength of 21,500. The calculated values for carbon and hydrogen were 91.24% and 8.76% respectively. 91.29% carbon and 8.96% hydrogen were found.

Since certain changes in carrying out the above process and certain modifications in the compositions which embody the invention may be made without departing from its scope, it is intended that all matter contained in the description shall be interpreted as illustrative and not in a limiting sense.

What is claimed is:

1. The method comprising treating a compound of the formula

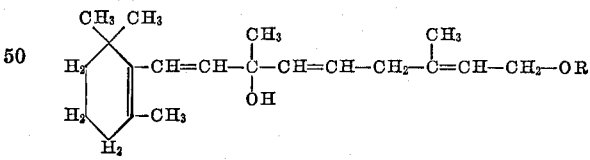

in which R is a lower alkyl radical, with a metallic amide selected from the group consisting of alkali and alkaline earth metal amides to provide a pentaene of the formula

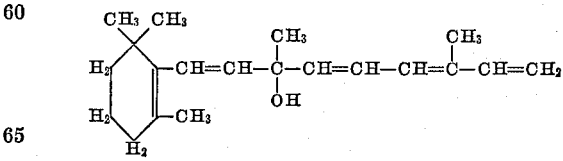

2. The method comprising treating a compound of the formula

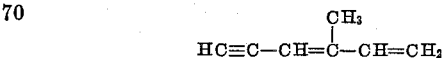

having a refractive index at 17° C. of 1.5158 and showing absorption in the ultraviolet with a maximum at 2590 A. and a molecular coefficient of extinction at that wavelength of 21,500 with a Grignard reagent to provide a compound of the formula

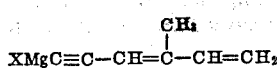

in which X is halogen, reacting this compound with β-ionone to provide a compound of the formula

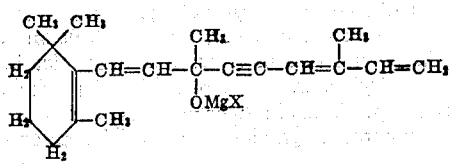

in which X is halogen, and hydrolyzing this compound to provide a compound of the formula

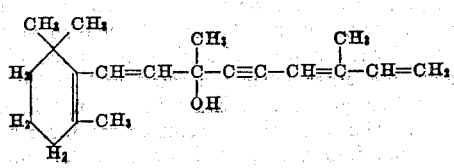

having a refractive index at 21° C. of 1.5548, showing absorption in the ultraviolet with a maximum at 2670 A. and a molecular coefficient of extinction at that wavelength of 23,800, and treating this compound with lithium aluminum hydride to provide a compound of the formula

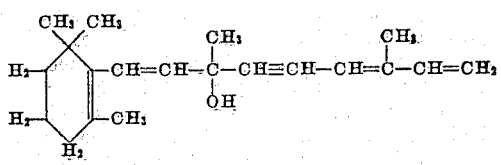

with a trans configuration at the 4,5'-double bonded linkage, having a refractive index at 20° C. of 1.5526, and showing absorption in the ultraviolet with a maximum at 2710 A. and a molecular coefficient of extinction at that wavelength of 29,100.

3. The method comprising treating a compound of the formula

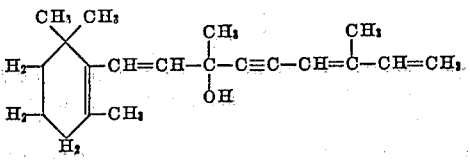

having a refractive index at 21° C. of 1.5548, showing absorption in the ultraviolet with a maximum at 2670 A. and a molecular coefficient of extinction at that wavelength of 23,800 with lithium aluminum hydride to provide a compound having the formula

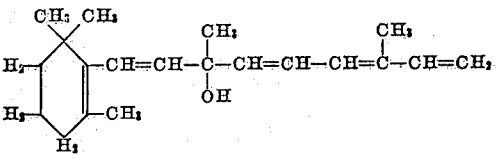

with a trans configuration at the 4,5-double bonded linkage, having a refractive index at 20° C. of 1.5526, and showing absorption in the ultraviolet with a maximum at 2710 A. and a molecular coefficient of extinction at that wavelength of 29,100.

References Cited in the file of this patent
UNITED STATES PATENTS

| | | |
|---|---|---|
| 1,202,282 | Graul | Oct. 24, 1916 |
| 1,896,162 | Carter et al. | Feb. 7, 1933 |
| 2,410,575 | Embree et al. | Nov. 5, 1946 |
| 2,445,627 | Morris et al. | July 20, 1948 |
| 2,475,139 | Isler et al. | July 5, 1949 |
| 2,587,457 | Freed | Feb. 26, 1952 |
| 2,655,548 | Evans et al. | Oct. 13, 1953 |

OTHER REFERENCES

Shantz et al.: Jour. Amer. Chem. Soc., vol. 65 (May 1943), pages 901–6 (6 pp.).

Nazarov et al.: Chem. Abstracts, 37 (1943), 2344 (1 p.).

Heilbron et al.: Jour. Chem. Soc. (London) (1945), pages 77–81 (5 pp.).

Johnson: "Acetylenic Compounds," vol. I, Acetylenic Alcohols; (I) pages 63, 64; (II) pages 71, 72. Publ. by Edward Arnold & Co., London (1946), 4 pp.

UNITED STATES PATENT OFFICE
Certificate of Correction

Patent No. 2,819,316                              January 7, 1958

William Oroshnik

It is hereby certified that error appears in the printed specification of the above numbered patent requiring correction and that the said Letters Patent should be read as corrected below.

Column 2, first formula under Compound III, the extreme right-hand portion of the formula should appear as shown below instead of as in the patent—

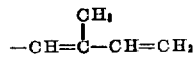

column 7, last formula in the column, the center portion of the formula should appear as shown below instead of as in the patent—

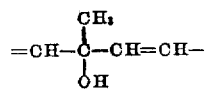

Signed and sealed this 4th day of March 1958.

[SEAL]

Attest:
KARL H. AXLINE,
*Attesting Officer.*

ROBERT C. WATSON,
*Commissioner of Patents.*